(12) United States Patent
Muller

(10) Patent No.: US 7,112,143 B2
(45) Date of Patent: Sep. 26, 2006

(54) THREAD FORMER OR TAP

(75) Inventor: Wolfgang Muller, Schwarzenbek (DE)

(73) Assignee: Fette GmbH, Schwarzenbek (DE)

( * ) Notice: Subject to any disclaimer, the term of this patent is extended or adjusted under 35 U.S.C. 154(b) by 41 days.

(21) Appl. No.: 10/484,640

(22) PCT Filed: Jul. 17, 2002

(86) PCT No.: PCT/EP02/07913

§ 371 (c)(1),
(2), (4) Date: Jan. 23, 2004

(87) PCT Pub. No.: WO03/011508

PCT Pub. Date: Feb. 13, 2003

(65) Prior Publication Data
US 2004/0185948 A1 Sep. 23, 2004

(30) Foreign Application Priority Data
Jul. 25, 2001 (DE) ................. 101 36 293

(51) Int. Cl.
B21J 13/02 (2006.01)

(52) U.S. Cl. ...................... 470/198; 470/204

(58) Field of Classification Search ............... 470/10, 470/66, 70, 71, 84, 198, 199, 204, 200, 203; 408/222, 223, 224, 144; 11/226; 409/65, 409/74, 78; 407/40, 101, 102, 118
See application file for complete search history.

(56) References Cited

U.S. PATENT DOCUMENTS

| | | | | |
|---|---|---|---|---|
| 2,212,753 A * | 8/1940 | Flater et al. | ................. | 408/217 |
| 2,240,840 A * | 5/1941 | Fischer | ........................ | 408/144 |
| 2,242,305 A * | 5/1941 | Koehler et al. | ................ | 279/49 |
| 2,325,627 A * | 7/1943 | Neilson | ....................... | 408/200 |
| 2,369,273 A * | 2/1945 | Bakewell | ..................... | 408/222 |
| 3,803,691 A | 4/1974 | Geese et al. | .................. | 29/200 |
| 4,316,683 A * | 2/1982 | Schott | ......................... | 408/219 |
| 5,580,196 A * | 12/1996 | Thompson | ................... | 408/145 |
| 5,725,336 A * | 3/1998 | Vilmanyi et al. | ........... | 408/219 |
| 5,733,078 A * | 3/1998 | Matsushita et al. | ........... | 409/74 |
| 5,865,847 A * | 2/1999 | Kohrs et al. | ................. | 128/898 |
| 5,980,166 A * | 11/1999 | Ogura | .......................... | 408/57 |
| 6,012,882 A * | 1/2000 | Turchan | ...................... | 409/74 |
| 6,146,060 A * | 11/2000 | Rydberg et al. | ............... | 407/40 |
| 6,524,034 B1 * | 2/2003 | Eng et al. | ...................... | 408/59 |
| 6,663,326 B1 * | 12/2003 | Hiroyasu et al. | ........... | 408/144 |
| 6,840,866 B1 * | 1/2005 | Vogel | ........................... | 470/19 |

FOREIGN PATENT DOCUMENTS

DE 35 37 087 4/1987

(Continued)

Primary Examiner—Ed Tolan
(74) Attorney, Agent, or Firm—Vidas, Arrett & Steinkraus

(57) ABSTRACT

Cold thread forming tap or screw tap with a shaft, said shaft having a chuck portion at the one end and a forming or cutting profile portion on the other end, the forming or cutting profile portion being realised as a separate profile element and being fixable centrically and secured against rotation on the shaft by means of a fixing device, characterised in that the profile element has a small axial length and on the outside a lead-in or starting tap cone, respectively, that juts and/or indentations are formed at the end of the shaft and on that side of the profile element facing the shaft, which interlock in a positively fitting manner, that an automatic centring of the profile element takes place on the shaft when the profile element is put onto the shaft.

12 Claims, 2 Drawing Sheets

FOREIGN PATENT DOCUMENTS

| | | |
|---|---|---|
| DE | 39 34 621 | 4/1991 |
| DE | 298 18 546 | 3/1999 |
| GB | 1 209 196 | 10/1970 |
| GB | 2 324 752 | 4/1998 |

\* cited by examiner

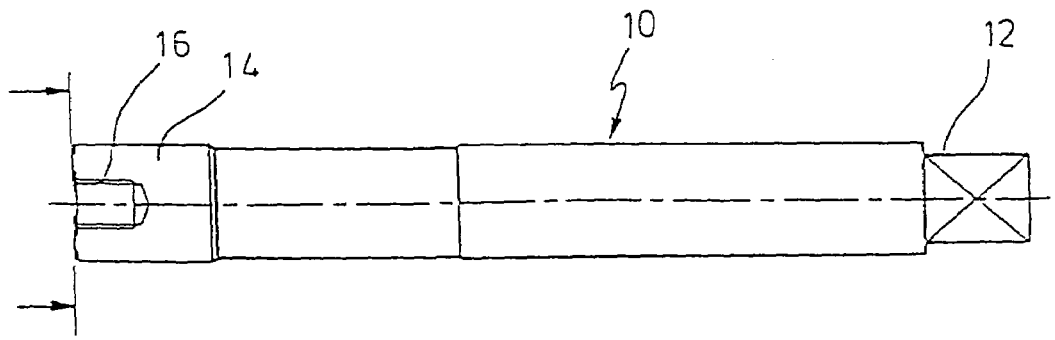
FIG. 1
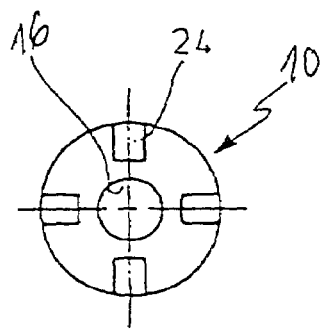
FIG. 2
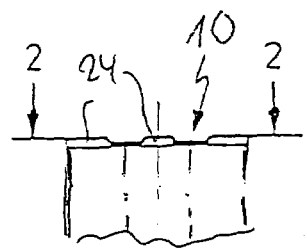
FIG. 3a
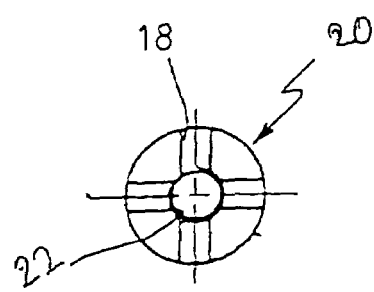
FIG. 4
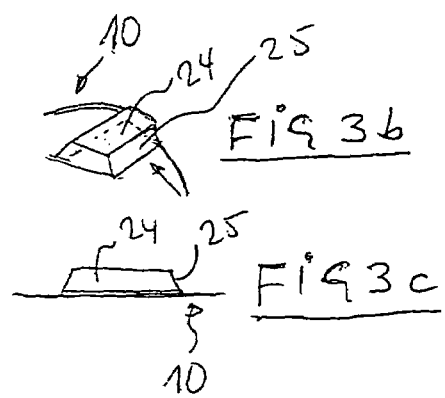
FIG. 3b
FIG. 3c

THREAD FORMER OR TAP

CROSS-REFERENCE TO RELATED APPLICATIONS

This application is the National Stage filing under 35 U.S.C. 371 from PCT/EP02/01913 now PCT Publication No. WO03/011508 having an international filing date of Jul. 17, 2002, claiming priority from German Application No. DE2001010136293.5 filed Jul. 25, 2001, now German Patent No. DE3934621 published on Sep. 4, 1997, on behalf of Fette GmbH, the entire contents of which are hereby incorporated herein in their entireties.

STATEMENT REGARDING FEDERALLY SPONSORED RESEARCH

Not Applicable

BACKGROUND OF THE INVENTION

It is known to create interior (or female) threads with the aid of a screw tap or a thread forming tap. Screw taps evolve from screw bolts by generating cutting edges through the introduction of axis parallel or slant flutes. In the lead-in region, a so-called starting taper is provided, which is mostly realised in conical form. The hole in the workpiece is pilot-drilled with the core diameter.

Thread forming taps are also geometrically derived from a screw bolt. However, they do not remove any material, but only displace it. The workpiece is therefore pilot-drilled with the average pitch diameter. The thread forming tap has an ascending profile on the cone point, which progressively displaces the material.

It is known to increase the wear resistance of thread forming taps through selection of the material they are made from and by heat treatment. On this occasion, particular advantages are brought about by coating with titanium nitride (Maschinenmarkt, Würzburg 92 (1986) 40, pages 88 to 92). But it is also known to form thread forming taps from hard metal (Maschine+Werkzeug 12/95, pages 26 to 28).

From DE 39 34 621 C2, a thread forming tap has become known, with a cylindrical chuck shaft and a form-giving region with polygonal cross-section differing from the annular shape, as well as with thread corrugations on the outer perimeter which correspond to the thread which is to be produced. In the region of the cross section corners of the form-giving region, cylindrical ridges from particularly hard and wear resistant material are soldered into corresponding, axially running grooves, which ridges have a contour on the outer perimeter matching the thread corrugations. Thread forming taps have the same thread profile as screw taps, but have a polygonal cross section in their profile portion, with three or six "corners", e.g.

The profile portion of thread forming taps and screw taps has a first forming region by which the thread is essentially produced, as well as a guiding portion following thereafter. This serves for the guiding of the tool when it is turned back from the bore, after completion of the interior thread.

Thread forming taps and screw taps are relatively expensive to manufacture and consist of a high-quality material, as the case may be. After wear or damage, the tool is no more useful.

The invention has the objective to create a cold thread forming tap or screw tap which can be produced with little expenditure of material and manufacture.

BRIEF SUMMARY OF THE INVENTION

In the tool according to the invention, the forming or cutting profile portion is realised as a separate profile element, which has at least two complete profile convolutions besides to a lead-in or starting taper cone, respectively, and which is fixable centrically and secured against rotation on the shaft by means of a fixing device.

The profile element can be plate-shaped or rather have a short axial length; besides to the lead-in and starting taper cone, respectively, it has relatively few complete profile convolutions, two to four for instance.

The shaft for the tool according to the invention can be manufactured in conventional manner and conventional dimensions from a material highly capable of bearing, particularly a suited steel. It has not to be discarded upon wearing of the profile element, but can be reused for many times. The invention makes also possible the provision of a plurality of different profile elements with different diameters, different pitches and so on, which can each be connected with one common unity shaft. Only the profile element is needed to consist of a suitable hard material. Through this, the material expense is significantly less than with conventional tools.

A relatively high torque has to be transmitted from the shaft to the profile element. According to the invention, juts and/or indentations are formed at the end of the shaft and on that side of the profile element facing the shaft, which interlock in a positively fitting manner. At the same time, these juts and indentations are formed such that they effectuate an automatic centring when the profile element is put onto the shaft.

The juts and indentations have complementary lateral areas inclined to the axis of the shaft and the profile element, respectively, which are in gearing for the purpose of centring and transmission of torque. These areas can be formed plane or crowned. Preferably, only the mentioned areas are in gearing, which means that the end areas of the profile element and the shaft have a distance from each other, when the profile element is attached on the shaft.

Preferably, the areas are formed on ribs and grooves, respectively, which are disposed radially crosswise, the centre point of the cross being on the axis of the shaft or the profile element, respectively. In order to facilitate the putting on of the profile element, the edges of the ribs and grooves can have a chamfer.

In the invention, it was found that with modern machine tools, more or less long guiding portions on cold thread forming taps or screw taps are no more necessary in order to turn out the tool without damaging the thread, when screwing it out of the produced thread bore.

As a material for the profile element, a hard metal, but also rapid machining steel, or an other known material can be used. It shall be understood that the outer diameter of the shaft of the thread forming tap has to be at least somewhat smaller than the core diameter of the thread which is to be created. By all means, one shaft can be used for profile elements for the production of different thread dimensions.

Different possibilities are conceivable to undertake a fixation of the separated profile element on the shaft. According to one form of the invention, one of them consists in that the profile element is fixed on the shaft by means of a screw in an axial thread bore. According to this, the profile element is provided with a centric bore, the screw having a conical portion e.g., which co-operates with a conical sink of the bore of the profile element. The screw does not contribute to the torque transmission from the shaft to the workpiece.

Alternatively, a threaded stem can be formed on the shaft, which either co-operates with a thread bore of the profile element, or a nut is provided, which is screwed onto the stem in order to fix the profile element on the shaft.

Finally, the profile element can be soldered on the shaft. However, the interchangeability is aggravated in this case, because the profile element has first to be heated when it is to be removed from the shaft.

In the invention described so far, one single profile element is centrically attached on the shaft. Another solution according to the invention provides that two or more identical plate-shaped separate form profiles are fixed on the front side of the shaft, in a manner secured against rotation. As well as the profiles described above, the forming profiles have thread profiles in the portion projecting over the shaft, for the creation of the interior thread. Such a tool is comparable to a thread rolling die for the creation of interior threads, with the exception that in the invention the "rolls" are fixed on the shaft in a manner secured against rotation. Furthermore, it is not necessary to use annular or rather polygonal bodies, but only portions thereof, because only the portions projecting over the shaft contribute to the creation of the thread. The tool described at last is particularly suited as a forming tool.

BRIEF DESCRIPTION OF THE DRAWINGS

The invention will be described in more detail below, by means of realisation examples represented in drawings.

FIG. 1 shows the side view of a shaft for a cold thread forming tap according to the invention.

FIG. 2 shows the front view of the shaft after FIG. 1

FIG. 3a shows the side view of the shaft after FIG. 2, whereas FIGS. 3b and 3c represent details.

FIG. 4 shows the top view on a profile element according to the invention.

DETAILED DESCRIPTION OF THE INVENTION

Figure 5:
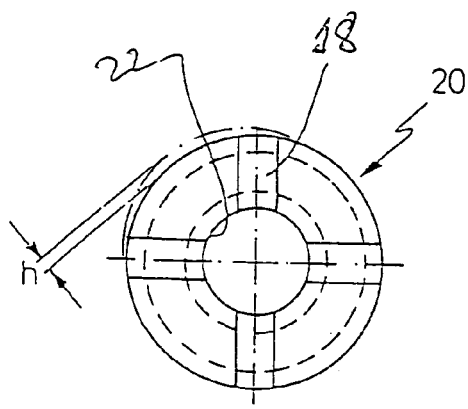
FIG. 5 shows a magnified view of a profile element similar to FIG. 4.

While this invention may be embodied in many different forms, there are described in detail herein a specific preferred embodiment of the invention. This description is an exemplification of the principles of the invention and is not intended to limit the invention to the particular embodiment illustrated.

In FIG. 1, a tool shaft 10 is represented which has a chuck portion 12 on the one end and on the other end a portion 14 for connection with a profile element after FIG. 4. From the end view of shaft 10 after FIG. 2 one can recognise that it has a centric thread bore 16 and crosswise arranged ribs 24, the cross of the ribs 24 coinciding in its centre point with the axis of the shaft 10 or the bore 16, respectively.

In FIG. 4, a plate-shaped forming profile element 20 is represented, which has a forming initiation cone as well as a thread profile (not shown) for the making of an interior thread according to the cold form grooving or thread forming method. The perimeter of the forming profile element 20 is polygonal, which is not represented in FIG. 4. Into further details of the profile element 20 will still be dwelled on in connection with FIGS. 5 and 6.

Figure 9:
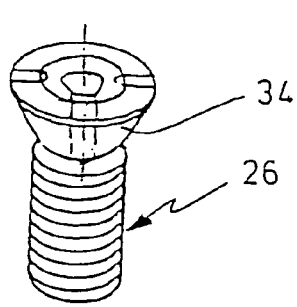
FIG. 9 shows a screw for the fixation of one of the shown profile elements on a tool shaft, the shaft after FIG. 1, e.g.

The profile element 20 has a centric bore 22 and crosswise radially arranged grooves 18 on one side. The grooves 18 are arranged and formed such that they fittingly accommodate the ribs 24. For the sake of an easier insertion, the grooves 18 and/or the ribs 24 have a chamfer on the longside edges. Through the positively fitting gearing of ribs 24 and grooves 18, a positive fitting is obtained, whilst the remaining area of the profile element 20 either sits plain on the remaining area of the end area of the shaft 10, or preferably has a certain separation from the latter. Through the bore 22, the shaft of a screw, like that represented in FIG. 9 at 26, is inserted and screwed into the thread bore 16, in order to connect the profile element 20 with the shaft 10 fixedly and secured against rotation. Thus, a two-part cold thread forming tool is made, and it is easily possible to attach another profile element on the shaft 10 by unscrewing the screw 26.

From the detail representations after FIGS. 3b and 3c it can be recognised that the juts or ribs 24 are trapezoid in cross section, i.e. that they have slant side faces, as one of them is represented at 25. The grooves 18 are provided with complementary side faces (not shown), so that only the areas 25 of the ribs 24 and the grooves are brought into gearing with each other upon putting the profile element 20 onto the shaft end 24, but not the end areas of shaft 10 and profile element 20. Because the radial ribs 24 and the radial grooves 18 stand perpendicular with respect to each other, a centring of the forming element 20 on the shaft 10 takes place automatically, for the areas 25 and the complementary areas of the grooves run parallel to diameters which stand perpendicular with respect to each other. The crossing point of the diameters is naturally situated on the axis of the profile element 20 and shaft 10.

In the case shown the areas 25 are planar. However, they can also be crowned and have the desired effect of centring and torque transmission in the same manner.

Figure 6:
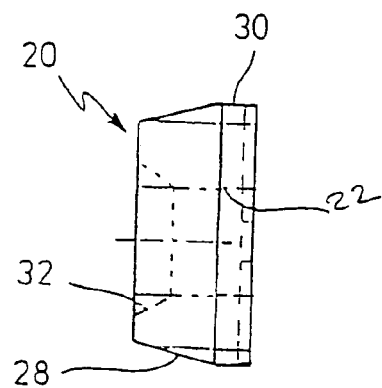
FIG. 6 shows the side view of the profile element after FIG. 5

The profile element 20 is represented in some more detail in FIGS. 5 and 6. One recognises from the front view after FIG. 5 that the profile element 20 is polygonal, i.e. that is has four "corners", the stroke between the corners being denoted with h. It is to be understood that a thread creation by non-cutting forming takes place only in the corner regions. In the FIGS. 5 and 6, grooves 18 are provided, which co-operate with corresponding ribs of a shaft like that represented in FIG. 1, in the same manner as has been elucidated in connection with FIGS. 1 to 4. The grooves 18, again, have slant wall faces on their sides, which co-operate with slant wall faces of ribs. As can be recognised in FIG. 6, the profile element 20 has a forming initiation cone 28 in conventional manner and a proper profile portion 30, with two to four convolutions of a forming thread. As indicated at 32, the bore 22 has a sink 32 for the accommodation of the cone 34 of the head of the screw 26 after FIG. 9.

Figure 7:
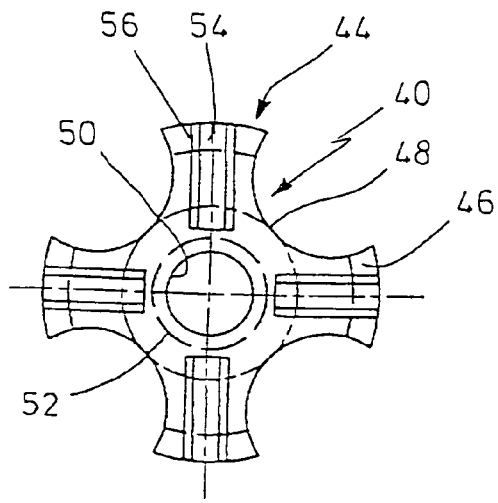
FIG. 7 shows the rear view of a profile element according to the invention for a thread cutting tool.
Figure 8:
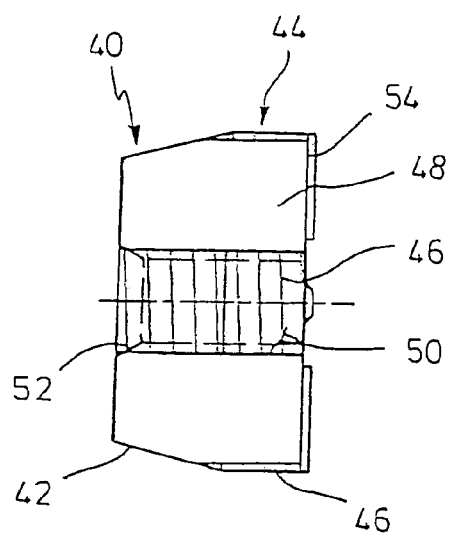
FIG. 8 shows the side view of the profile element after FIG. 7

In the FIGS. 7 and 8, a profile element 40 for a thread-cutting tool (screw tap) is represented. As can be recognised from FIG. 8, the profile element 40 has a conical starting taper 42 as well as a thread cutting portion 44. The thread cutting portion 44 consists of four bars 46 disposed at 90° separation, which are provided with corresponding thread portions on the perimeter, as this is known from screw taps. Between the bars 46, flutes 48 are disposed, respectively. The profile element 40 has a bore 50, which has a sink 52 on the end which is on the left side in FIG. 8, for the accommodation of a screw head of a screw after FIG. 9, for instance. On the side facing the not shown shaft, the profile element 40 has crosswise arranged ribs 54, comparable with the ribs 24 after FIGS. 3a and 3b. The ribs 54 have slant faces 56, which co-operate with the slant faces of the grooves of the not shown shaft for the profile element 40.

The attachment of the profile element after FIGS. 7 and 8 on the tool shaft is the same as that of the profile elements as described in FIG. 4. Only the disposition of the ribs and grooves is reversed with respect to FIGS. 2 and 4. Consequently, it can be offhand replaced by an other one after wearing, or even be replaced by a profile element which is shaped otherwise.

Figure 10:
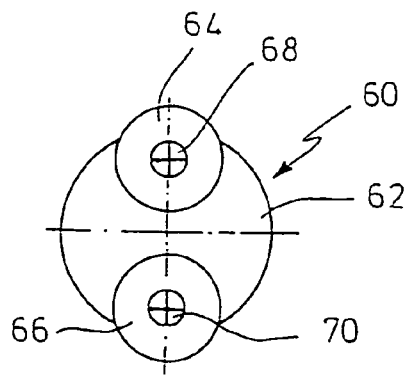
FIG. 10 shows the front view of another embodiment of a profile element according to the invention.

In FIG. 10, a shaft of a cold thread forming or thread cutting tool, e.g. a shaft after FIG. 1, is represented with its front side 62 at 60. On the front side 62, two profile elements 64 and 66, respectively, are fixed in a perimeter spacing of 180°, with the aid of screws 68 and 70, respectively, which are comparable to the screw 26 after FIG. 9. The profile elements 64, 66 resemble e.g. on the perimeter the profile element 20 after FIG. 4, and are therefore suited for cold form tapping. Preferably, even four such profile elements will have to be preferred, so that a polygon similar to that after FIG. 5 evolves again. As the generating thread is disposed around the perimeter in the profile elements 64, 66, it is also imaginable to turn the profile elements 64, 66 at a certain angle after previous disassociation, in order to bring another profile region into action, which has not be worn yet. Through this, the profile elements 64, 66 resemble so-called indexable inserts with respect to their application.

It is to be understood that profile elements like those after FIG. 10 can be used for thread cutting also.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. Cold thread forming tap or screw tap comprising a shaft having two ends, said shaft having a chuck portion at the one end and a forming or cutting profile portion on the other end, the forming or cutting profile portion being realised as a separate profile element and being fixable centrically and secured against rotation on the shaft by means of a fixing device, the profile portion having a small axial length and an outside, the outside having lead-in or starting tap cone, juts and/or indentations formed on the profile portion facing the shaft, which interlock in a positively fitting manner, that an automatic centering of the profile portion takes place on the shaft when the profile portion is put onto the shaft, the juts and indentations comprising complementary lateral areas, inclined with respect to an axis of the shaft and the profile portion, respectively, which are in gearing for the purpose of centering and transmission of torque, wherein the profile portion does not have more than two to four complete thread forming convolutions.

2. Cold thread forming tap or screw tap according to claim 1, wherein the juts and indentations have complementary lateral areas inclined with respect to an axis of the shaft and the profile portion, which are in gearing for the purpose of centering and transmission of torque.

3. Cold thread forming tap or screw tap according to claim 2, wherein the positively fitting gearing of profile portion and shaft takes place only via the lateral areas.

4. Cold thread forming tap or screw tap according to claim 2 the lateral areas comprising side faces.

5. Cold thread forming tap or screw tap according to claim 4, further comprising first areas running parallel to a first diameter and second areas running parallel to a second diameter which stands perpendicular on the first diameter, the crossing point of the diameters being on an axis of the profile portion or the shaft.

6. Cold thread forming tap or screw tap according to claim 1, wherein the lateral areas are planed or crowned.

7. Cold thread forming tap or screw tap according to claim 1, the juts comprising ribs and the indentations comprising grooves which are complementary to the ribs.

8. Cold thread forming tap or screw tap according to claim 7, wherein the ribs and grooves are disposed radially crosswise, the centre point of the cross being on the axis of an shaft or the profile portion.

9. Cold thread forming tap or screw tap according to claim 1, wherein the profile portion is fixed on the shaft by a centric screw in an axial thread bore.

10. Cold thread forming tap or screw tap according to claim 1, wherein the shaft has a centric thread bolt and the profile portion has a centric bore through which the thread bolt extends, and that the centric bore has a thread or that a screw nut is provided for the attachment of the profile portion on a bolt.

11. Cold thread forming tap or screw tap according to claim 1, wherein the profile portion is soldered on the shaft.

12. Cold thread forming tap or screw tap according claim 1, wherein the shaft consists of a material highly strainable with respect to bending and torsion, and the profile portion consists of a suitable hard material.

* * * * *